United States Patent [19]

Thompson

[11] Patent Number: 4,556,828
[45] Date of Patent: Dec. 3, 1985

[54] ELECTRIC MOTOR ADAPTED TO PERMIT TRANSLATIONAL MOTION BETWEEN FIELD AND ARMATURE

[75] Inventor: Thomas W. Thompson, Hopkinton Village, N.H.

[73] Assignee: Sanders Associates, Inc., Nashua, N.H.

[21] Appl. No.: 548,176

[22] Filed: Nov. 2, 1983

[51] Int. Cl.⁴ .................. H02K 29/02; H02K 5/24
[52] U.S. Cl. ............................ 318/254; 318/138; 318/439; 310/51
[58] Field of Search ............. 318/138, 254 A, 254, 318/439; 310/51, 67

[56] References Cited

U.S. PATENT DOCUMENTS

| Re. 27,446 | 10/1966 | Welch | 310/49 |
| 2,378,668 | 5/1943 | Vickers | 172/36 |
| 2,413,805 | 8/1943 | Vickers | 172/36 |
| 2,454,359 | 7/1945 | Vickers | 172/36 |
| 3,334,253 | 4/1966 | Hill | 310/82 |
| 3,558,944 | 2/1969 | Verge | 310/82 |
| 3,561,834 | 3/1969 | Durand | 310/49 |
| 4,080,553 | 3/1978 | Lyman | 318/254 A X |
| 4,109,170 | 8/1978 | Fujita et al. | 318/254 X |
| 4,127,799 | 11/1978 | Nakamura et al. | 318/138 X |
| 4,142,119 | 2/1979 | Madey | 310/46 |
| 4,211,963 | 7/1980 | Müller | 318/138 X |
| 4,455,516 | 6/1984 | Furusho | 318/254 |

FOREIGN PATENT DOCUMENTS

| 54-161006 | 12/1979 | Japan | 310/51 |
| 57-20162 | 2/1982 | Japan | 310/51 |
| 58-159653 | 9/1983 | Japan | 318/254 |

*Primary Examiner*—William M. Shoop, Jr.
*Assistant Examiner*—Bentsu Ro
*Attorney, Agent, or Firm*—Louis Etlinger; Stanton D. Weinstein

[57] ABSTRACT

A DC motor particularly adapted to operate in the presence of translational movement between the armature (rotor) and the field (stator) magnets. The field magnets comprise a plurality of magnets formed into a pair of concentric, closed-spaced, parallel rings mounted to rings of soft, magnetic material. The armature is a planar armature wound in a serpentine pattern so as to cross back and form between the rings only on radial lines from a center point on the armature. The radial conductor lines are sized with respect to the width of the magnetic ring such that even in the presence of translational motion, only the radial conductors cross between the rings and the motor can continue to operate.

27 Claims, 7 Drawing Figures

ELECTRIC MOTOR ADAPTED TO PERMIT TRANSLATIONAL MOTION BETWEEN FIELD AND ARMATURE

BACKGROUND OF THE INVENTION

The present invention relates to electrical motors and, more particularly, to a DC motor adapted to permit translational motion between the field member and the armature.

Most electrical motors are adapted to operate with a generally circular armature and circular magnetic field producing member in concentric alignment. Small variations in tolerance between the center points of the armature and the field producing member can be tolerated; but, major translational movement and offset between the two results in non-operation of the motor. Accordingly, such applications as the direct driving of vehicle wheels require that the entire motor be mounted with the sprung wheel assembly or, in the alternative, that it be mounted elsewhere and be connected to the sprung wheel assembly through U-Joints, or the like.

What would be ideal for such applications is a motor wherein the armature could be rigidly attached to the frame and the field producing member mounted to the rotating, sprung wheel to drive the wheel while, at the same time, allowing translational motion between the wheel/field member and the armature. Such a configuration would reduce the amount of sprung weight, eliminate U-Joints, and allow for a truly brushless DC motor with the attendant elimination of trouble-producing brushes and commutator rings.

Wherefore, it is the object of the present invention to provide such a DC motor.

SUMMARY

The foregoing objective has been accomplished in the DC motor of the present invention comprising a plurality of first magnets disposed adjacent one another so as to form a first magnetic ring of outer diameter $d_o$ and inner diameter $d_i$ in a first plane; a plurality of second magnets disposed adjacent one another so as to form a second magnetic ring of outer diameter $d_o$ and inner diameter $d_i$ in a second plane concentrically aligned in close-spaced, parallel relationship to the first magnetic ring with the poles of the first magnets aligned with poles of opposite magnetic polarity on the second magnets; and a planar armature adapted to be connected to a DC electrical source and disposed in a third plane between the first and second magnetic rings in closed-spaced, parallel relationship to each of them, the armature being wound in the first plane in a serpentine path so as to cross back and forth between the first and second magnetic rings only on radial lines from a center point of the armature when the armature center point is aligned with the center points of the magnetic rings and when the armature center point is translated from alignment with the center points of the magnetic rings within a pre-established radius from the center points of the magnetic rings.

In the preferred embodiment, the armature is rigidly mounted and the magnetic rings are interconnected and mutually carry a shaft concentrically aligned with the center points, the shaft being mounted to rotate the magnetic rings about the armature and to permit translational motion of the magnetic rings within the limits of the pre-established radius. Since the armature is nonrotating in this embodiment, it can be connected directly to the electrical source without the requirement of brushes and a commutator.

In an alternate embodiment requiring brushes and a commutator, the magnetic rings are rigidly mounted and the armature carries a shaft concentrically aligned with the armature's center point, the shaft being mounted to rotate the armature between the magnetic rings and to permit translational motion of the armature within the limits of the pre-established radius.

It is additionally preferred in either embodiment that first and second annular rings of soft, magnetic material be concentrically attached to respective ones of the magnetic rings on the surfaces thereof opposite the armature.

DESCRIPTION OF THE PREFERRED AND ALTERNATE EMBODIMENTS

The specification hereinafter describes a DC electric motor according to the present invention in which the center of rotation of the armature (rotor) can shift within pre-established limits relative to the center of the magnetic field producing member (stator). The nature of the motor is indicated in simplified form in FIGS. 1 and 2. In order to simplify the illustration, only eight radial conductors are indicated in the armature in FIGS. 1 and 3. As those skilled in the art will recognize, these same principles apply for a multiplicity of conductors. Where required, the method of commutation is not shown, however, connection and/or commutation must be such that current from a DC source (not shown) is caused to flow in the direction of the arrows along the conductors of FIGS. 1 and 3, as more fully described hereinafter; and, it is this current flow which produces a torque which, in turn, tends to produce rotation of the conductors relative to the poles. In an electric motor, commutation provides switching so that DC current in every wire flows in the correct direction to produce torque in the desired direction. It is not simply used to connect between stationary and rotating members—slip rings would suffice for that purpose. As is well known to those skilled in the art, brushless DC motors do not require brushes and commutators. The source polarity for a coil is switched electronically to maintain a constant direction of torque as each coil moves from pole to pole. Optical or electromagnetic sensing of motor angle is typically employed to trigger switching at the appropriate time. Except as it relates to improvements, this aspect is generally not included in the description which follows in order to keep the specification brief and to avoid redundancy.

The illustrations of the figures make it clear that the motor of the present invention is of the pancake type. The center of the armature can shift in the plane of the armature relative to the poles of the magnets without affecting the air gap or the magnetic circuit in any significant way.

Figure 1:
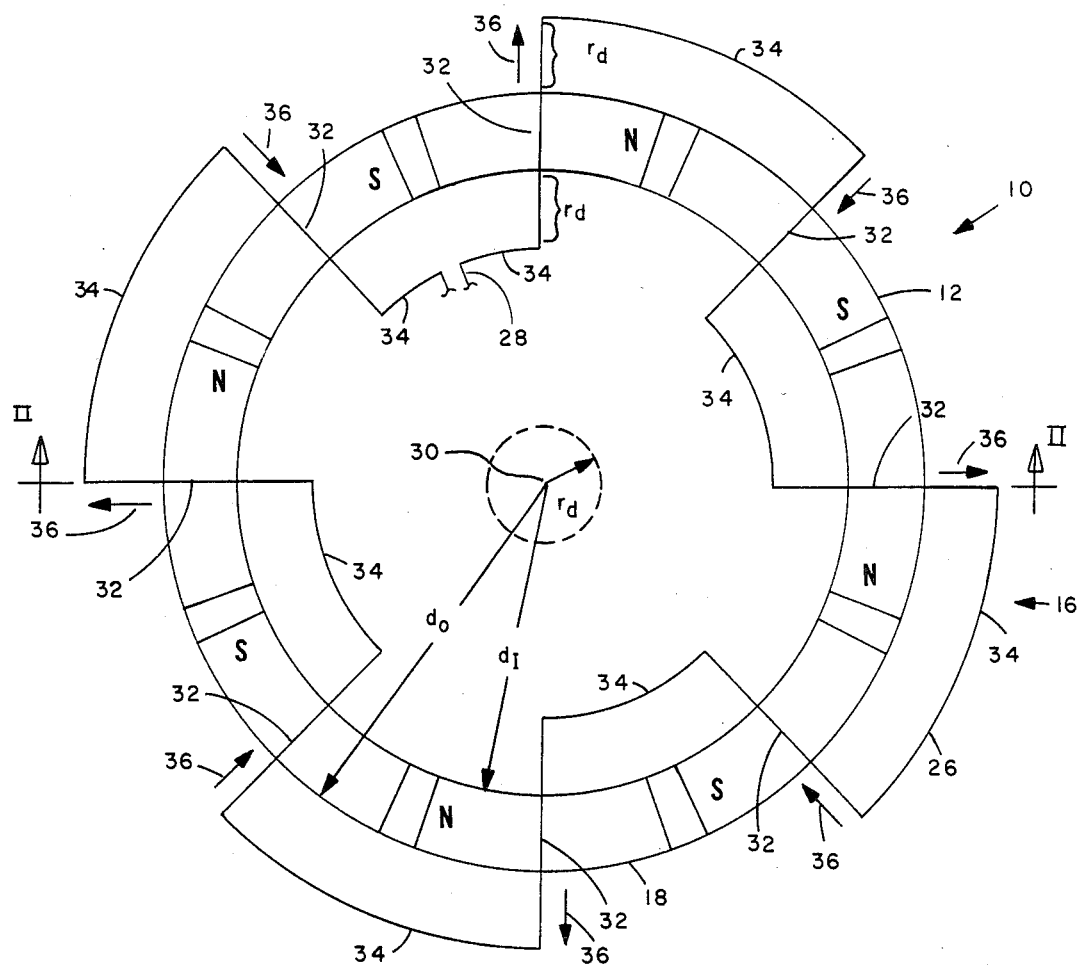
FIG. 1 is a very simplified plan view representing the motor of the present invention with the center points aligned.
Figure 2:
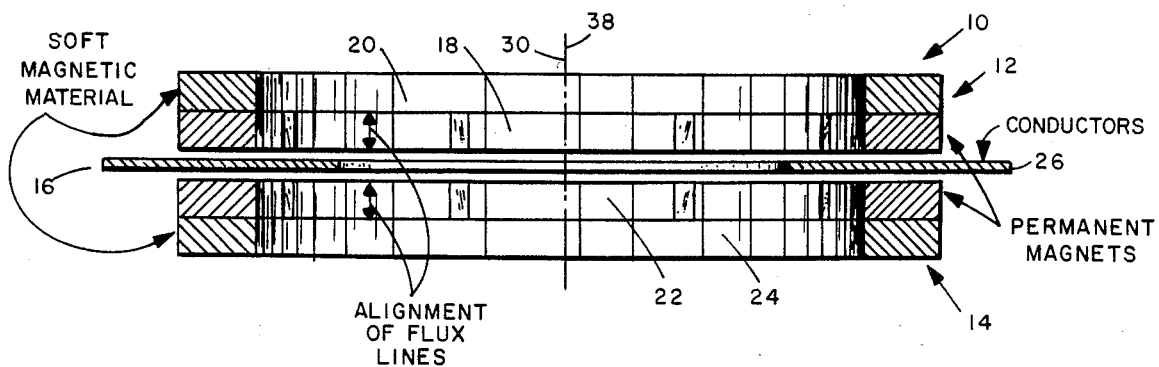
FIG. 2 is a cutaway view of the motor representation of FIG. 1 in the plane II—II.

Turning first to FIGS. 1 and 2 with particularity, the motor 10 of the present invention is shown in simplified form. The motor 10 comprises a pair of magnetic field flux producing ring members 12 and 14 with a planar armature 16 disposed therebetween. Ring member 12 comprises a plurality of first magnets 18 disposed adjacent one another so as to form a magnetic ring of outer diameter $d_o$ and inner diameter $d_i$. The first magnets 18 are attached to a circular ring 20 of like inner and outer diameters which is of a soft, magnetic material. In similar manner, the ring member 14 is comprised of a plurality of second magnets 22 attached to a circular ring 24, also of soft, magnetic material. As can be seen, the circular rings 20, 24 are disposed on the outer surfaces of the first and second magnets 18, 22; and, the first and second magnets 18, 22 are concentrically disposed in close-spaced, parallel relationship. The poles of the first and second magnets 18, 22 are aligned in opposite polarity such that the magnetic flux from each pole of the ring member 12 flows through the gap between it and the other ring member 14 as well as the armature 16 to a pole of opposite polarity disposed opposite it in the ring member 14.

The feature of the motor of the present invention which makes possible the non-concentric operation to be described in detail hereinafter is the shape of the conductors of the armature 16 and their positional relationship to the ring members 12, 14. Armature 16 comprises a conductor 26 adapted at 28 for connection to a DC electrical source in a manner well known to those skilled in the art, depending on the application. Conductor 26 is wound in a plane in a serpentine path so as to cross back and forth between the ring members 12, 14 only on radial lines from the center point 30. The conductor 26 is thus divided into a sequence of working parts 32 and innerconnecting parts 34. The working parts 32 are essentially radial about the armature center 30. That is, the conductor 26 is wound so as to cross the magnets 18, 22 (and therefore, through the field therebetween) only at the working parts 32; i.e., only on radial lines from the center points 30 of the armature 16. As can be seen from the arrows 36 which indicate the direction of current flow, the current flows in opposite directions in adjacent, radial working parts 32 of the conductor 26 comprising the armature 16.

Figure 3:
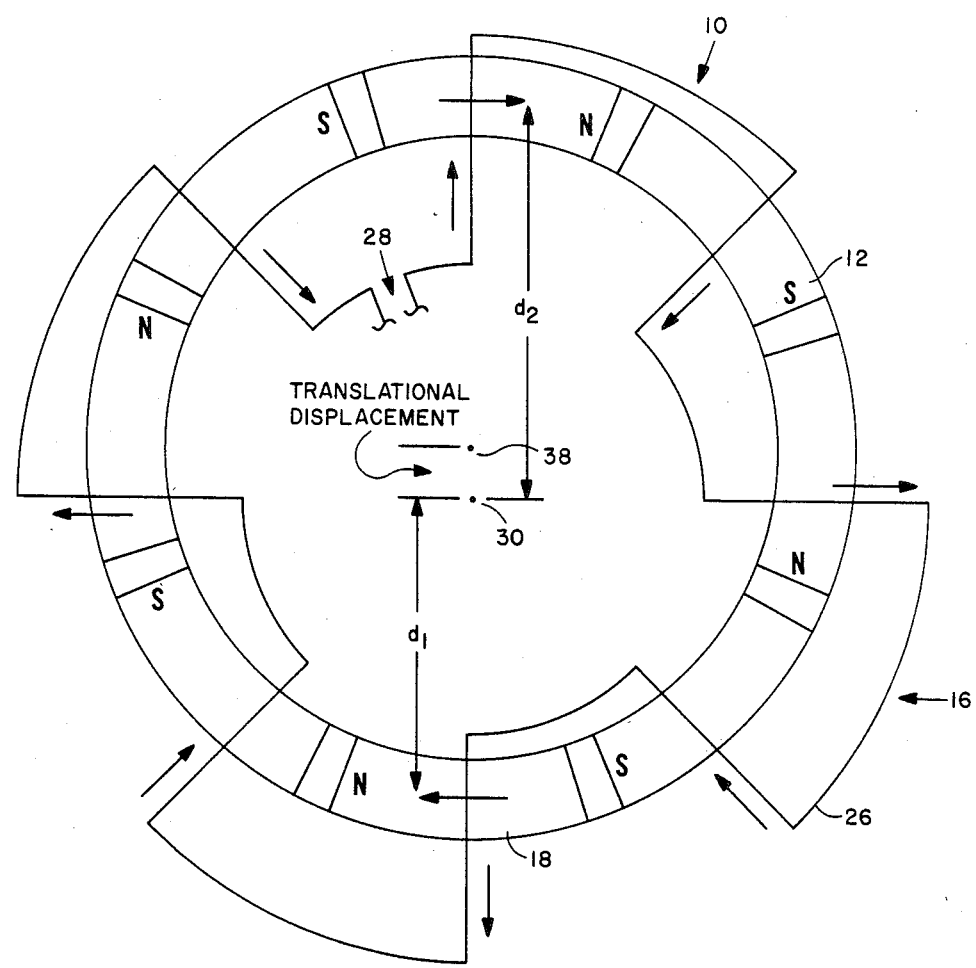
FIG. 3 is a plan view of the simplified motor representation of FIG. 1 showing the effect of a translational movement between the two center lines.

As shown in FIG. 1, the width of the ring members 12, 14 is equal to $d_o-d_i$. Further, the ring members 12, 14, are centered on the working parts 32 when the ring members 12, 14, and the armature 16 are concentrically aligned. Moreover, the working parts 32 are of a length which is approximately $3(d_o-d_i)$. A distance slightly shorter than the width of the ring members 12, 14 is designated as $r_d$ (for "radial displacement") as indicated in FIG. 1. As a result, the ring members 12, 14 and the armature 16 can be translationally displaced with respect to each other anywhere within a radius $r_d$ of the center point 30 while still having the basic premise of the motor met, that is, the working parts 32 will be the only portions of the conductor 26 crossing the field between the magnetic 18, 22. Thus, as designed, the motor 10 of the present invention is fully operational within these translational limits of the center points 30,38. This can be seen further with particularity in the drawing of FIG. 3 wherein the center point 30 of the armature has been displaced translationally with respect to the center point 38 of the ring members 12, 14. In this case, all of the torques on the working parts 32 are not equal. The total torque on the armature 16, however, will be about the same as that for the undisplaced condition of FIG. 1. Differences in torque on the individual working parts 32 are caused by the differences in the radii relative to the poles of the ring member 12, 14. Essentially, a reduction in torque on one working part 32 is made up by a corresponding increase in the torque on the working part which is 180° displaced. Torque, of course, is a measure of force times the distance through which it is applied. With reference to FIG. 3, the torque on the armature 16 from the lower magnet as the figure is viewed operates through a lever arm of $d_1$ while, simultaneously, the torque of the upper magnet as the figure is viewed operates through a lever arm of $d_2$. Because of the translational motion, the reduction in the length of $d_1$ is exactly equal to the amount of increase in the length of $d_2$. The resultant torque, therefore, is substantially identical.

Those skilled in the art will recognize that there is an actual reduction in torque when the armature 16 moves off-center from the magnets 18, 22. This torque reduction may be tolerated or may be improved in manners to be discussed shortly, but, for purposes of completeness of the disclosure, should be considered. The direction of force on a wire is determined by a known relative direction of current in the wire and direction of the magnetic flux in which the wire is embedded. If either flux or current reverses, the force direction reverses. If both flux and current reverse, then the force direction remains the same. When the armature 16 is centered as shown in FIG. 1, the unique serpentine pattern winding places the wire at the center of each magnetic face. At each crossing of wire and flux, therefore, torque is always in the same direction. With reference to FIG. 3, however, note that the translational displacement has caused the wire of the armature 16 to be below the center of the magnetic faces at three o'clock and at nine o'clock but on-center at the twelve o'clock and six o'clock positions. Other wires, not shown for clarity, would be rotationally displaced in FIG. 1 and would be over the opposite poles at three o'clock and nine o'clock if translationally displaced as in FIG. 3. At those points a reverse torque would be developed.

Figure 4:
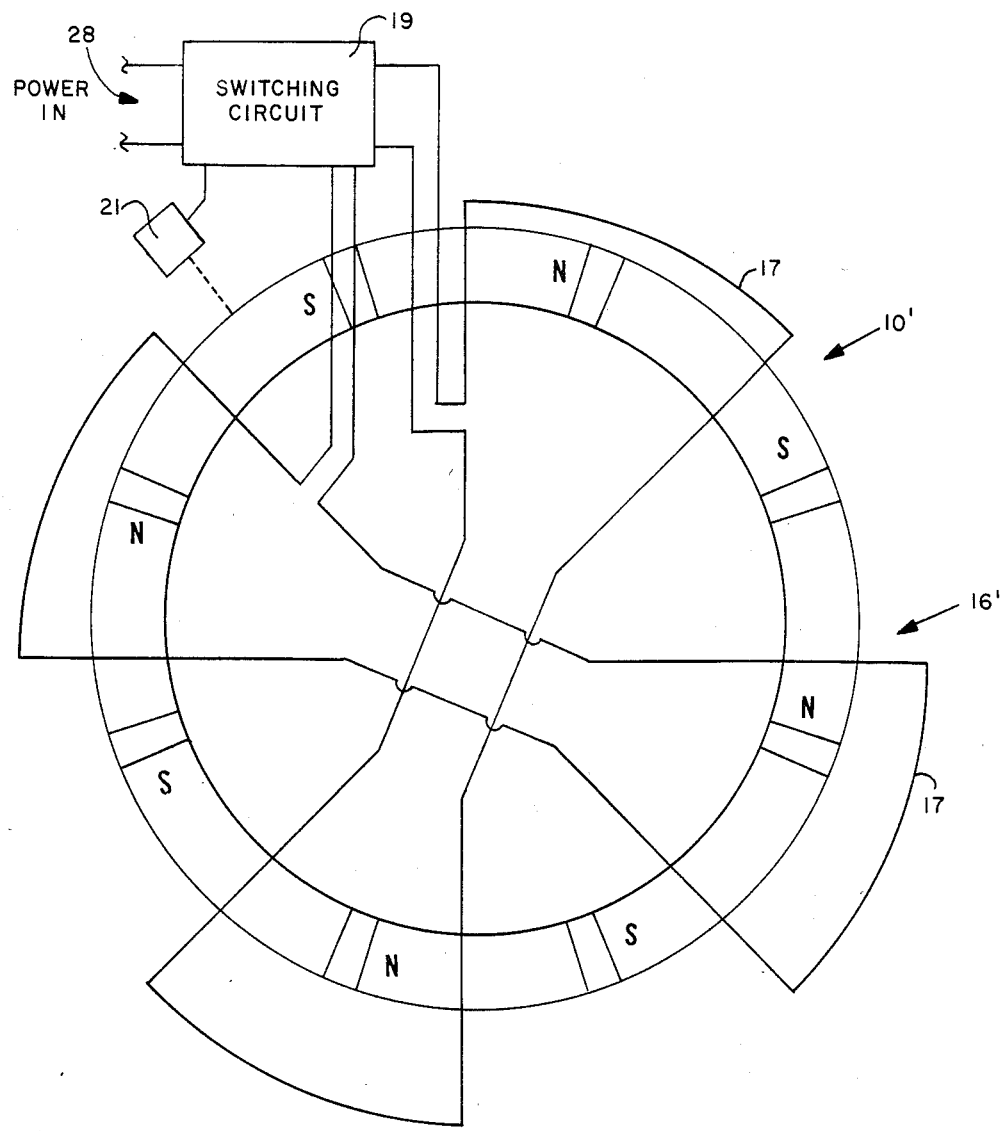
FIG. 4 is a very simplified plan view of an improvement to the motor of the present invention employing a multi-winding arrangement with switching control of the windings.
Figure 5:
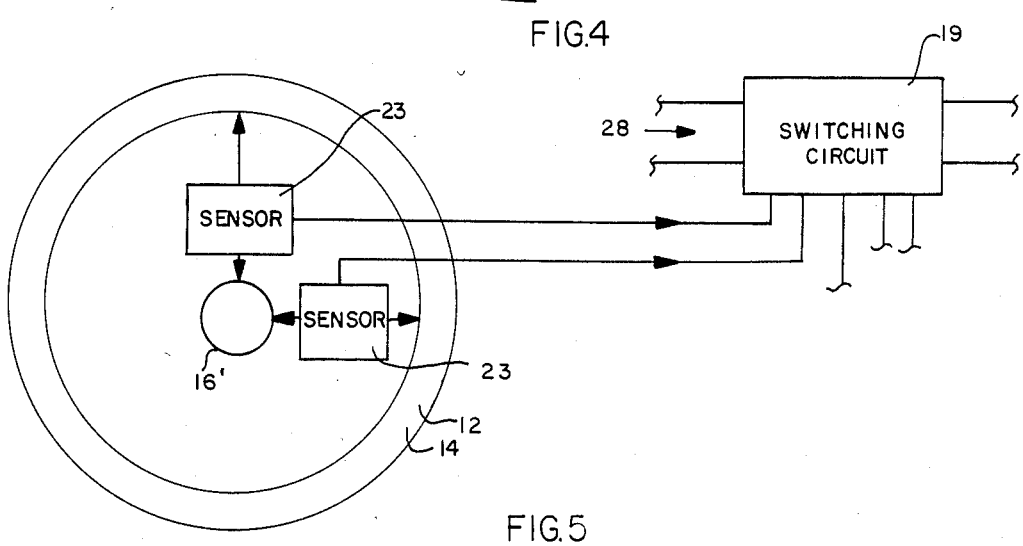
FIG. 5 is an improvement upon the improvement of FIG. 4 adding sensors of traditional movement with inputs to the switching control.

Two techniques for minimizing the effect of these reverse torques during translational movement are shown in FIGS. 4 and 5. In FIG. 4, the motor 10' is of a multi-winding, brushless DC motor arrangement. The armature 16' is composed of segments 17 which have the power thereto individually controlled by the switching circuit 19 which has the connection to DC 28 incoming thereto. Positional sensor 21 is connected to the switching circuit 19 and senses the position of the motor in its rotational aspect. As previously mentioned, the positional sensor 21 can be of an optical or electromagnetic type. Based on the motor angle as sensed by the positional sensor 21, the switching circuit 19 can switch out a particular winding or segment 17 when the wire of the winding is near the interval between poles of the magnets 18, 22.

As shown in FIG. 5, additional sensors 23 can be positioned to sense translational offset between the armature 16' and the ring members 12, 14 with their electrical signal outputs tied further into the switching circuit 19. By so doing, the switching in and out of the segments 17 can be based on both the angular motor position as determined by sensor 21 as well as the amount and direction of translational offset as provided by the sensors 23.

Figure 6:
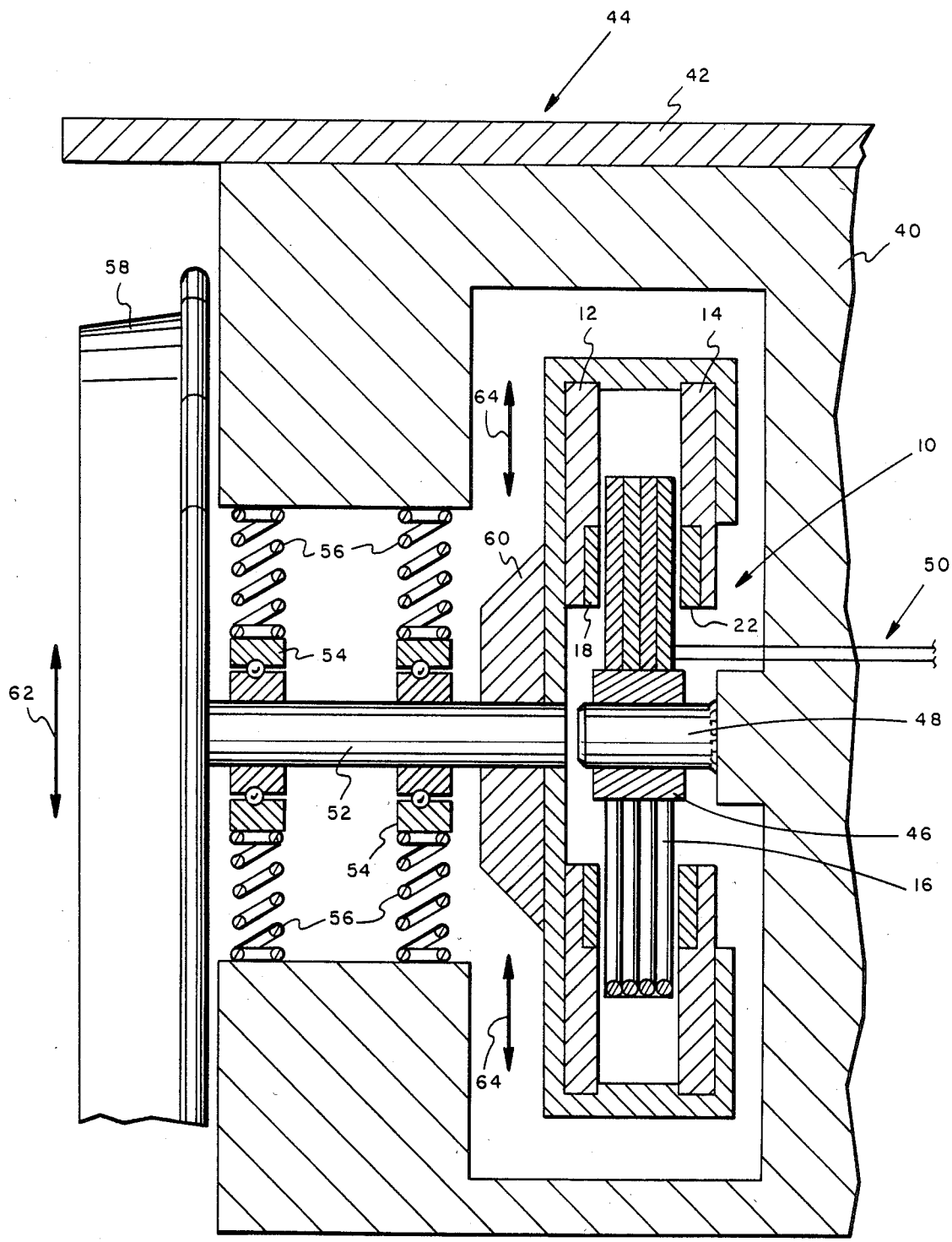
FIG. 6 is a partially cutaway view through a simplified version of the motor of the present invention in its preferred, brushless configuration as used to drive a wheel of a vehicle.

Turning now to FIG. 6, the motor of the present invention is shown in simplified form as a brushless DC motor used to directly drive the wheel of a railroad car. It should be recognized that the present illustration is illustrative only and that other arrangements and wheel types could be adapted using the same approach. Also, it should be noted that the drawing is in simplified form to show functional elements only and such items as end thrust bearings and spring dampeners have been omitted for clarity.

The motor 10 is attached to support structure 40 positioned under the platform floor 42 of the railroad car 44. The armature 16 is mounted on a hub 46 which, in turn, is attached to a shaft 48 which is attached to the support structure 40 as by welding. The armature 16 is non-rotatably mounted; therefore, the electrical connection can be made directly through the wires 50. The rotating portion comprises a shaft 52 rotatably mounted on bearings 54 which, in turn, are suspended with respect to the support structure 40 by springs 56. As mentioned previously, in an actual embodiment, appropriate damping (as with the use of hydraulic shock absorbers) and appropriate thrust bearings (to maintain the air gaps between the armature and the magnets of the motor) would be required. The wheel 58 to be driven is attached to the outer end of the shaft 52. A support cage structure 60 is attached to the inner end of the shaft 52 and carries the ring members 12, 14 concentrically disposed about the armature 16 for rotational motion as a result of the DC current applied to the wires 50 which, in turn, drives the shaft 52 and the wheel 58. As can be seen, as the wheel 58 moves up and down with respect to the platform floor 42 and support structure 40, as indicated by the arrows 62, the support cage structure 60 and ring members 12, 14 move translationally with respect to the armature 16, as indicated by the arrows 64.

Figure 7:
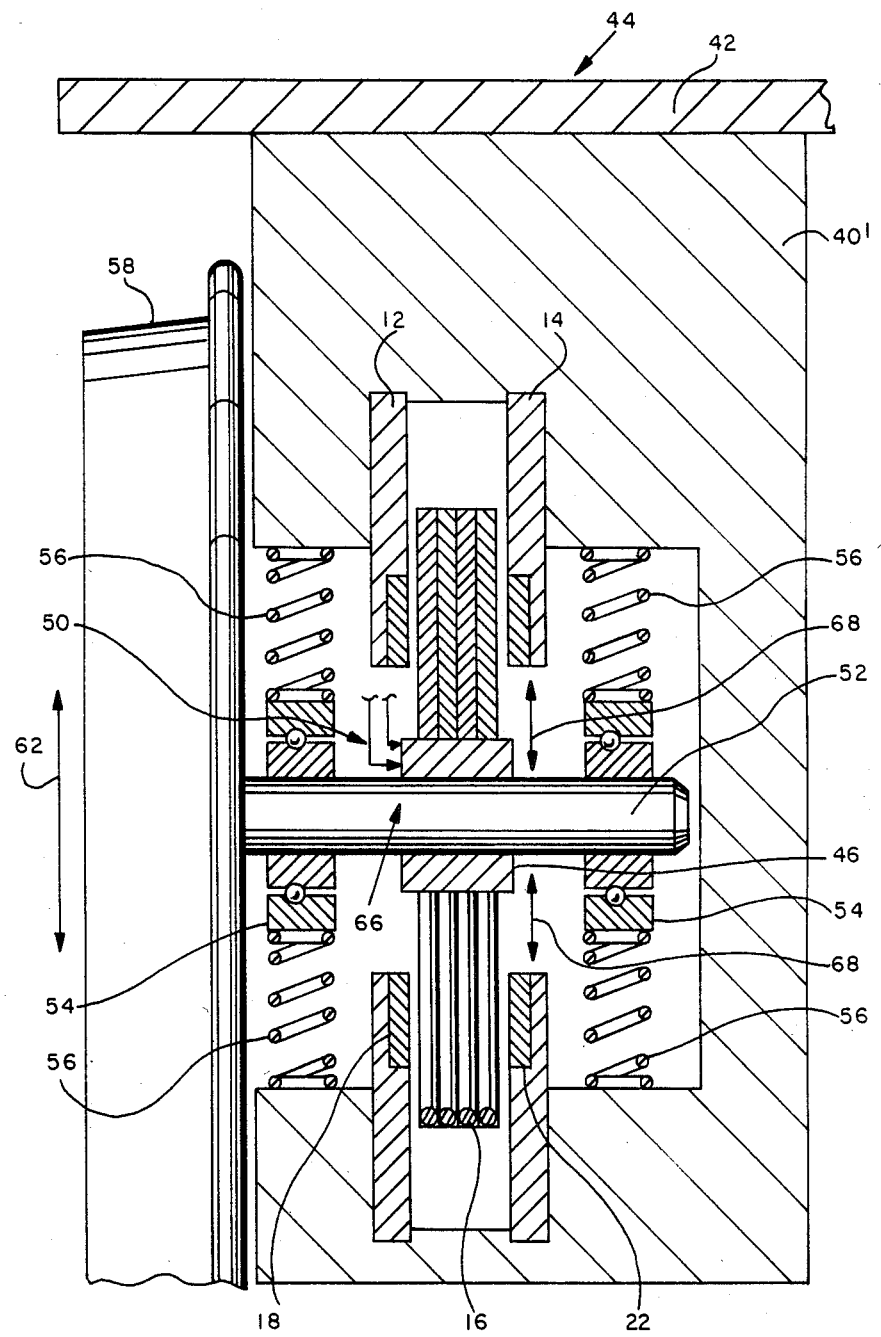
FIG. 7 is a drawing similar to that of FIG. 4 showing the alternate embodiment of the present invention in the same application wherein the armature rotates, thus requiring commutation.

Turning now to FIG. 7, the motor 10 of the present invention is shown as applied to the same railroad car application but in an embodiment wherein the armature 16 moves and the field flux producing ring members 12, 14 are stationary. In this embodiment, the wheel 58 is once again mounted on shaft 52, which is carried by the bearings 54, which are, in turn, suspended from the platform 40' by the springs 56. Armature 16, however, is mounted by its hub 46 directly to shaft 52 between the two bearings 54 for rotation with shaft 52. Appropriate commutation for the wires 50 is, therefore, required, such as at 66. The two ring members 12, 14 are directly attached to the support structure 40', as shown, with the armature 16 therebetween. As DC current is provided through wires 50, commutator 66, and the armature 16, the armature 16 is rotated which, in turn, rotates the shaft 52 and the wheel 58. As previously, as the wheel 58 moves translationally in the direction of arrow 62, the armature 16 moves translationally with shaft 52 with respect to the ring members 12, 14, as indicated by the arrows 68.

From the foregoing description, it should be apparent that the motor of the present invention accomplishes its stated objective. Those skilled in the art will recognize that the illustrations and examples are in simplified form for ease of explanation only and that many variations are possible within the scope and spirit of the present invention as claimed hereinafter.

Wherefore, having thus described my invention, I claim:

1. A DC motor comprising:
    (a) a plurality of first magnets disposed adjacent one another so as to form a first magnetic ring of outer diameter $d_o$ and inner diameter $d_i$ in a first plane;
    (b) a plurality of second magnets disposed adjacent one another so as to form a second magnetic ring of outer diameter $d_o$ and inner diameter $d_i$ in a second plane concentrically aligned in close-spaced, parallel relationship to said first magnetic ring with the poles of said first magnets aligned with poles of opposite magnetic polarity on said second magnets; and
    (c) a planar armature comprising an electrical conductor adapted to be connected to a DC electrical source and disposed in a third plane between said first and second magnetic rings in close-spaced, parallel relationship to each of them, said armature being wound in said third plane in a serpentine path so as to cross back and forth between said first and second magnetic rings only on radial lines from a center point of said armature when said armature center point is aligned with the center points of said magnetic rings and when said armature center point is translated from alignment with said center points of said magnetic rings within a pre-established radius from said center points of said magnetic rings, the portions of said armature conductor on said radial lines being the working portions of said armature.

2. The motor of claim 1 wherein:
    (a) said armature is a multi-turn armature having a plurality of segments; and additionally comprising,
    (b) first sensor means for detecting the rotational angle of the motor; and,
    (c) switching means operably connected to said segments, said first sensor means, and the DC electrical source for supplying DC power of proper polarity to respective ones of said segments when the position of each segment with relation to said first and second magnets is such as to provide proper torque and for supplying no power to ones of said segments rotationally positioned so as to impart a high reverse torque.

3. The motor of claim 2 and additionally comprising:
    (a) second sensor means operably connected to said switching means for sensing translational displacement in the motor; and wherein,
    (b) said switching means is adapted to modify the switching on and off of said segments as a function of the amount of said translational displacement.

4. The motor of claim 1 wherein:
    (a) said armature is rigidly mounted; and
    (b) said magnetic rings are interconnected and mutually carry a shaft concentrically aligned with their center points, said shaft being mounted to rotate said magnetic rings about said armature and to permit translational motion of said magnetic rings within the limits of said pre-established radius.

5. The motor of claim 1 wherein:
(a) said magnetic rings are rigidly mounted; and
(b) said armature carries a shaft concentrically aligned with the armature's center point, said shaft being mounted to rotate said armature between said magnetic rings and to permit translational motion of said armature within the limits of said pre-established radius.

6. The motor of claim 1 and additionally comprising:
first and second annular rings of soft, magnetic material concentrically attached to respective ones of said magnetic rings on the surfaces thereof opposite said armature.

7. The motor of claim 1 wherein:
said working portions extend outwardly beyond $d_o$ and inwardly within $d_i$ substantially an equal amount $r_d$ and $r_d$ is said pre-established radius.

8. An electric motor comprising:
(a) an armature comprising an electrical conductor adapted to be connected to an electrical source, said armature being wound in a serpentine path to form interconnected radial conductor working portions lying substantially along radius lines passing through the center point of the armature so as to have the current flow in opposite directions in adjacent ones of said radial conductors;
(b) magnetic field flux producing means for producing a ring of magnetic flux comprising a plurality of alternating magnetic polarities, the flux lines of said magnetic flux being normal to the plane of said armature, said ring of magnetic flux being disposed to cross over only said radial conductors,
(c) wherein the center of said armature and the center of said magnetic field flux producing means are translationally movable with respect to each other.

9. The motor of claim 8 wherein said magnetic field flux producing means comprises:
(a) a first plurality of magnets disposed so as to form a first magnetic ring in a first plane; and
(b) a second plurality of magnets disposed so as to form a second magnetic ring in a second plane concentrically aligned in close-spaced, parallel relationship to said first magnetic ring.

10. The motor of claim 9 wherein:
poles of said first plurality of magnets are aligned with poles of opposite magnetic polarity on said second plurality of magnets.

11. The motor of claim 9 wherein:
(a) said armature is rigidly mounted; and
(b) said magnetic rings are interconnected and mutually carry a shaft concentrically aligned with their center points, said shaft being mounted to rotate said magnetic rings about said armature and to permit translational motion of said magnetic rings.

12. The motor of claim 9 wherein:
(a) said magnetic rings are rigidly mounted; and
(b) said armature carries a shaft concentrically aligned with the armature's center point, said shaft being mounted to rotate said armature between said magnetic rings and to permit translational motion of said armature.

13. The motor of claim 9 and additionally comprising:
first and second annular rings of soft, magnetic material concentrically attached to respective ones of said magnetic rings on the surfaces thereof opposite said armature.

14. The motor of claim 9 wherein:
(a) said first magnetic ring has an outer diameter and an inner diameter in the first plane;
(b) said second magnetic ring has an outer diameter substantially equal to the outer diameter of said first magnetic ring, and an inner diameter substantially equal to the inner diameter of said first magnetic ring; and
(c) said working portions extend outwardly beyond the outer diameter and inwardly within the inner diameter.

15. The motor of claim 14 wherein:
said working portions extend outwardly beyond the outer diameter and inwardly within the inner diameter substantially an equal distance that is at least substantially equal to a permitted relative translational movement of the center of said armature and the center of said magnetic field flux producing means.

16. The motor of claim 8 wherein:
(a) said armature is a multi-turn armature having a plurality of segments; and additionally comprising,
(b) first sensor means for determining the rotational angle of the motor; and,
(c) switching means operably connected to each of said segments and to said first sensor means, and adapted to be operably connected to the electrical source for supplying DC power of proper polarity to respective ones of said segments when the position of each segment with relation to said first and second magnets is such as to provide proper torque and for supplying no power to ones of said segments rotationally positioned so as to impart a high reverse torque.

17. The motor of claim 16 and additionally comprising:
(a) second sensor means operably connected to said switching means for sensing translational displacement in the motor; and wherein,
(b) said switching means is adapted to modify the switching on and off of said segments as a function of the amount of said translational displacement.

18. The motor of claim 8 wherein:
said magnetic field flux producing means has an outer radius and an inner radius in a first plane; and
said working portions extend outwardly beyond the outer radius and inwardly within the inner radius substantially an equal amount while the center of said armature and the center of said magnetic field flux producing means are aligned with respect to each other.

19. The motor of claim 18 wherein the equal amount is less than or substantially equal to the difference between the outer radius and the inner radius.

20. A DC motor comprising:
(a) a rigidly mounted planar armature comprising an electrical conductor adapted to be connected to a DC electrical source, said armature being wound in a serpentine path to create interconnected radial conductor working portions lying substantially along radius lines passing through the center point of the armature so as to have the current flow in opposite directions in adjacent ones of said radial conductors; and
(b) magnetic field flux producing means for producing a ring of magnetic flux comprising a plurality of alternating magnetic polarities, the flux lines of said magnetic flux being normal to the plane of said armature, said ring of magnetic flux being disposed to cross over only said radial conductors, wherein said magnetic field flux producing means comprises:

a first plurality of magnets disposed so as to form a first magnetic ring in a first plane; and a second plurality of magnets disposed so as to form a second magnetic ring in a second plane concentrically aligned in close-spaced, parallel relationship to said first magnetic ring, wherein said magnetic rings are interconnected and mutually carry a shaft concentrically aligned with their center points, said shaft being mounted to rotate said magnetic rings about said armature and to permit translational motion of said magnetic rings.

21. The motor of claim 20 and additionally comprising:

first and second annular rings of soft, magnetic material concentrically attached to respective ones of said magnetic rings on the surfaces thereof opposite said armature.

22. The motor of claim 20 wherein:

(a) said first magnetic ring has an outer diameter and an inner diameter in the first plane;

(b) said second magnetic ring has an outer diameter substantially equal to the outer diameter of said first magnetic ring, and an inner diameter substantially equal to the inner diameter of said first magnetic ring; and (c) said working portions extend outwardly beyond the outer diameter and inwardly within the inner diameter substantially an equal amount.

23. A DC motor comprising:

(a) a planar armature comprising an electrical conductor adapted to be connected to a DC electrical source, said armature being wound in a serpentine path to create interconnected radial conductor working portions lying substantially along radius lines passing through the center point of the armature so as to have the current flow in opposite directions in adjacent ones of said radial conductors; and (b) magnetic field flux producing means for producing a ring of magnetic flux comprising a plurality of alternating magnetic polarities, the flux lines of said magnetic flux being normal to the plane of said armature, said ring of magnetic flux being disposed to cross over only said radial conductors, wherein said magnetic field flux producing means comprises:

a first plurality of magnets disposed so as to form a first magnetic ring in a first plane; and a second plurality of magnets disposed so as to form a second magnetic ring in a second plane concentrically aligned in close-spaced, parallel relationship to said first magnetic ring, wherein said magnetic rings are rigidly mounted; and (c) wherein said armature carries a shaft concentrically aligned with the armature's center point, said shaft being mounted to rotate said armature between said magnetic rings and to permit translational motion of said armature.

24. The motor of claim 23 and additionally comprising:

first and second annular rings of soft, magnetic material concentrically attached to respective ones of said magnetic rings on the surfaces thereof opposite said armature.

25. The motor of claim 23 wherein:

(a) said first magnetic ring has an outer diameter and an inner diameter in the first plane;

(b) said second magnetic ring has an outer diameter substantially equal to the outer diameter of said first magnetic ring, and an inner diameter substantially equal to the inner diameter of said first magnetic ring; and (c) said working portions extend outwardly beyond the outer diameter and inwardly within the inner diameter substantially an equal amount.

26. A DC motor comprising:

(a) a planar armature comprising an electrical conductor adapted to be connected to a DC electrical source, said armature being wound in a serpentine path to create interconnected radial conductor working portions lying substantially along radius lines passing through the center point of the armature so as to have the current flow in opposite directions in adjacent ones of said radial conductors, wherein said armature is a multi-turn armature having a plurality of segments;

(b) magnetic field flux producing means for producing a ring of magnetic flux comprising a plurality of alternating magnetic polarities, the flux lines of said magnetic flux being normal to the plane of said armature, said ring of magnetic flux being disposed to cross over only said radial conductors;

(c) first sensor means for determining the rotational angle of the motor;

(d) switching means operably connected to said segments, said first sensor means, and the DC electrical source for supplying DC power of proper polarity to respective ones of said segments when the position of each segment with relation to said first and second magnets is such as to provide proper torque and for supplying no power to ones of said segments rotationally positioned so as to impart a high reverse torque; and (e) second sensor means operably connected to said switching means for sensing translational displacement in the motor;

(f) wherein said switching means is adapted to modify the switching on and off of said segments as a function of the amount of said translational displacement.

27. The motor of claim 26 wherein:

said working portions extend outwardly beyond said flux producing means and inwardly within said flux producing means substantially an equal amount.

* * * * *